United States Patent [19]
Fieldhouse

[11] Patent Number: 5,307,346
[45] Date of Patent: Apr. 26, 1994

[54] NETWORK-FIELD INTERFACE FOR MANUFACTURING SYSTEMS

[75] Inventor: John H. Fieldhouse, Sussex, England

[73] Assignee: Reflex Manufacturing Systems Limited, Derby, England

[21] Appl. No.: 671,441

[22] Filed: Mar. 19, 1991

[30] Foreign Application Priority Data

Mar. 24, 1990 [GB] United Kingdom ............... 9006661

[51] Int. Cl.⁵ .................................. H04L 12/40
[52] U.S. Cl. ...................... 370/85.1; 370/94.1
[58] Field of Search ............... 370/85.1, 85.7, 91, 370/94.1, 85.15; 340/825.03, 825.05, 825.06, 825.07, 825.22, 825.23, 825.52

[56] References Cited

U.S. PATENT DOCUMENTS

| | | | |
|---|---|---|---|
| 4,827,423 | 5/1989 | Beasley et al. | 364/468 |
| 4,855,906 | 8/1989 | Burke | 364/200 |
| 4,897,834 | 1/1990 | Peterson et al. | 370/85.1 |

FOREIGN PATENT DOCUMENTS

| | | |
|---|---|---|
| 0180926 | 10/1985 | European Pat. Off. . |
| 0262922 | 4/1988 | European Pat. Off. . |
| 0299523 | 1/1989 | European Pat. Off. . |
| 0331478 | 9/1989 | European Pat. Off. . |
| 2049243 | 12/1980 | United Kingdom . |
| 2208553 | 4/1989 | United Kingdom . |

*Primary Examiner*—Wellington Chin
*Attorney, Agent, or Firm*—Cushman, Darby & Cushman

[57] ABSTRACT

A network-field interface, termed an NFI, is intended for digitally interfacing at least one host computer on a network to at least one field device. The network operates with a predetermined communications protocol including READ and WRITE services. The NFI comprises I/O ports for connection to the field devices, a modem to facilitate communication between the network and the interface, a CPU, volatile and non-volatile memory accessible to both the modem and the CPU, and program modules resident in the memory. The program modules are executable by the CPU to map the READ and WRITE services of the network onto the NFI's I/O ports. In this way the host computer is able to READ and WRITE directly to the I/O ports through the modem.

28 Claims, 14 Drawing Sheets

NETWORK-FIELD INTERFACE FOR MANUFACTURING SYSTEMS

This invention relates to the interfacing of a host computer on a network to field devices of the type used in manufacturing systems and automated process control, such as CNC machine tools, robots, automatic guided vehicles, valves, sensors, keyboards, displays, etc.

Many of the devices used in factories or process plants are capable of being controlled or monitored from a host computer. However, different equipment suppliers have differing standards for enabling communication between the device and a computer.

The following problems arise from this situation:

a) The host computer may not directly support the electrical connections required by the device. Consequently, a customized adaptor may be needed to connect the device.

b) The host computer may have a physical limit to the number of devices of differing standards that can be connected to it.

c) The positioning of the host computer and the equipment connected to it will be to some extent constrained by the differing operational limits of the various devices.

d) Even if the above physical limitations are overcome, there is still the need to customize software for the host computer to take into account the various different protocols and peculiarities of the individual devices.

These problems have been recognised in the past and have been addressed by making use of computer networking concepts, in which devices and host computers use common communication protocols to send and receive data over a network. An internationally recognised standard for manufacturing networks has emerged, called the Manufacturing Automation Protocol, or MAP. Inherent in the current standard of MAP (Version 3.0) is the Manufacturing Message Specification, MMS, which provides a standard set of services for controlling or monitoring manufacturing devices connected to the network. Although devised for manufacturing systems, MAP is also applicable to process plant control.

While MAP-compatible devices connected to a MAP network go a long way towards solving the above problems, it is nevertheless true that most existing manufacturing or process devices are not MAP-compatible and therefore cannot be connected to MAP networks unless the expensive customising process mentioned in (d) above is undertaken.

British Patent Application No. GB 2208553 A shows one prior known approach to the problem of connecting non-standard equipment to a standard protocol network. It discloses a communication adaptor which interfaces a device, such as a CNC machine tool or coordinate measuring tool, to a network. Where necessary, the communications adaptor translates data, commands and programs between the format used by the network and the format specific to each device.

Although the communication adapter described in the above-mentioned patent application probably represents a step forward in specific situations of interest to the manufacturing engineer, there remains the need for an interface unit more generally applicable to shop-floor, office and process plant control networks.

In particular, the above-mentioned prior proposal is of limited use because it requires that:

a) each device actively interfaced to the network must have its own controller, the controller being a computer for accepting commands or programs to cause the device to perform a desired task;

b) there be a communication adapter provided for each device interfaced to the network;

c) the communication adapter be programmed differently for each device to which it is connected; and d) a token ring local area network be used, whereas the MAP international standard requires a token bus network.

It is an object of the present invention to provide an interface unit, termed herein a Network-Field Interface or NFI, which is capable of interfacing a wide variety of digitally controlled or monitored devices to a network operating with a predetermined communications protocol, such as a MAP network.

Another object is to provide an NFI which is capable of interfacing a plurality of devices to such a network.

A further object of the invention is to reduce or eliminate the need to program the NFI differently for each device to which it is connected.

Yet another object of the invention is to provide an NFI which is fully compatible with token bus technology, particularly MAP 3.0.

In accordance with the present invention expressed in its simplest terms, there is provided a network-field interface, hereinafter referred to as an NFI, intended for digitally interfacing at least one host computer on a network to at least one field device, the network operating with a predetermined communications protocol including READ and WRITE services, the interface comprising:

(a) I/O port means for connection to the at least one field device;

(b) communication means to facilitate communication between the network and the interface;

(c) data processing means;

(d) memory means accessible to both the communication means and the data processing means; and (e) program means resident in the memory means and executable by the data processing means to map the READ and WRITE services onto the I/O port means, whereby the host computer is able to READ and WRITE directly to the I/O port means through the communication means.

In the above statement of invention, the verb "to map" is used in its technical and mathematical sense, as known to those skilled in programming and digital design techniques.

Because the NFI is programmed to map the READ and WRITE services of the network directly onto its own I/O ports, it becomes effectively "transparent" insofar as the host computer is concerned in its communication with a field device attached to an I/O port. The program means which achieves this I/O effect may be termed a "Virtual Manufacturing Device" or IO VMD, because it is nevertheless what the host computer actually communicates with, rather than the field device. Consequently, even if field devices connected to the NFI's I/O ports are not compatible with the communications protocol used by the network, the NFI can still effectually interface the field devices to the network.

Preferably, the I/O port means for the field devices comprise a first plurality of parallel I/O ports and a second plurality of serial I/O ports, the program means containing means for creating respective corresponding parallel I/O data sets and serial I/O data sets as appropriate for the network communications protocol.

In the preferred embodiment, each of the parallel I/O data sets comprise a sixteen element array of boolean values corresponding one-to-one with the members of a corresponding one of the three groups of parallel I/O's, each data set also being provided with a further boolean variable to indicate whether the connections in its corresponding group of parallel I/O's are inputs or outputs.

Similarly, each of the serial I/O data sets comprises a set of variables to allow the corresponding serial I/O port to be monitored and controlled by a host computer, each data set comprising variables representing presence of input and output to and from the port respectively and variables representing data configuration required by the port.

The above described program means or IO VMD is adequate to provide direct control of the NFI's I/O ports by a host computer, and is therefore suitable for interfacing simple field devices, such as digital sensors and switches, to the network. These have the characteristic that they do not have a communications protocol of their own. However, more sophisticated devices, such as programmable logic controllers (PLC's), have their own built-in communications protocols which may not be compatible with the network's protocol. Consequently, if it is desired that the host computer read or write data to or from an internal location of such a field device, it will often be necessary to use a device-specific protocol to enable the operation to be performed. We therefore prefer the program means to include a set of protocol programs for commonly used field device communications protocols and a program module which, using a preselected one of the protocol programs, maps the READ and WRITE services of the network communications protocol through an I/O port of the NFI onto designated data locations within a device attached to the port. Conveniently, the NFI is provided with user interface facilities to enable protocol program selection at the time of connection of the field device to the I/O port.

The program module which achieves the mapping between the READ & WRITE services of the network's communication protocol and the data locations within the attached field device may be termed a Complex Device VMD, or CD VMD, and again it is this with which a host computer actually communicates.

In this connection, the program means should include means to allow a host computer in communication with the NFI to define a plurality of variables within the CD VMD, which variables can be mapped onto the internal locations of the attached field device. The mechanism for achieving this involves the READ & WRITE services referring to the variables in the CD VMD and then the CD VMD calling upon the preselected protocol program to access the attached device. A host computer defines the "name", "type" and "address" of each variable, this information being a three-part definition of the variable. The "name" and "type" information are used by host computers when referencing the variable, and the "address" information is used by the protocol program. The "address" information defines the location of the data corresponding to the variable in the attached device, and whenever a READ or WRITE service is requested, the "address" information is passed to the protocol program to allow it properly to access the attached device.

Advantageously, we provide the CD VMD with the ability to continuously and automatically poll predetermined variables on a regular basis, using a sample-and-hold mechanism. This reduces the time needed by a host computer to access a field device attached to the NFI consequent upon the host computer making a READ request for a specified variable via the network's READ & WRITE services, because the READ request can be immediately satisfied by the CD VMD returning the last sampled value of the variable. Preferably, the CD VMD is also provided with means for notifying a host computer if a change occurs in the value of a variable designated by the host computer.

It is further preferred to provide the IO and CD VMD's with the ability to manipulate flag bits in the parallel or serial I/O data sets relating to operation of a field device attached to the I/O ports of the NFI, thereby to coordinate host computer access to the I/O ports. In particular, this may involve delaying READ or WRITE requests from or to the parallel or serial I/O data sets consequent upon flag bit presence or absence therein.

In our preferred embodiment, the network's communication protocol comprises the Manufacturing Message Service (MMS) international standard, the parallel and serial I/O data sets corresponding to domains as specified for MMS and the flag bits corresponding to semaphores as also specified for MMS. In particular, the network can be a Manufacturing Automation Protocol (MAP) network, preferably a carrierband, broadband or fibre-optic MAP network.

An exemplary embodiment of the invention will now be described with reference to the accompanying drawings, in which.

Figure 3:
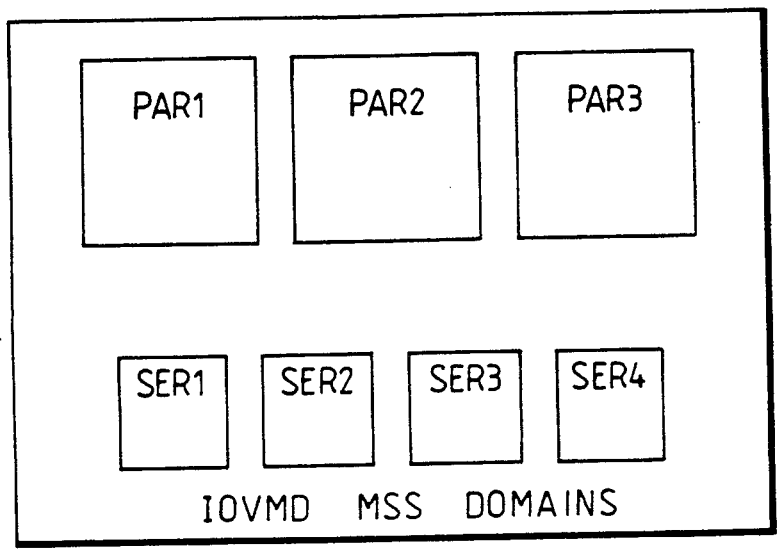
Figure 4:
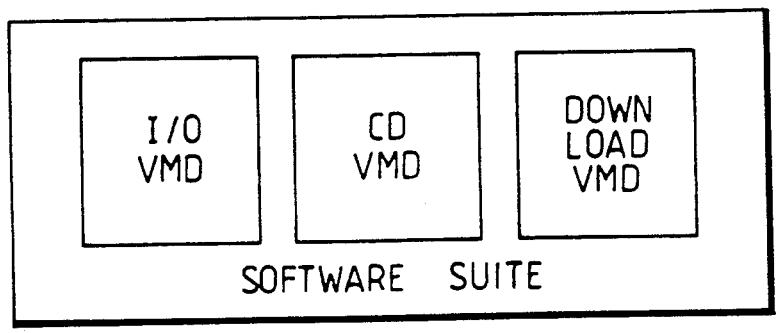
Figure 5:
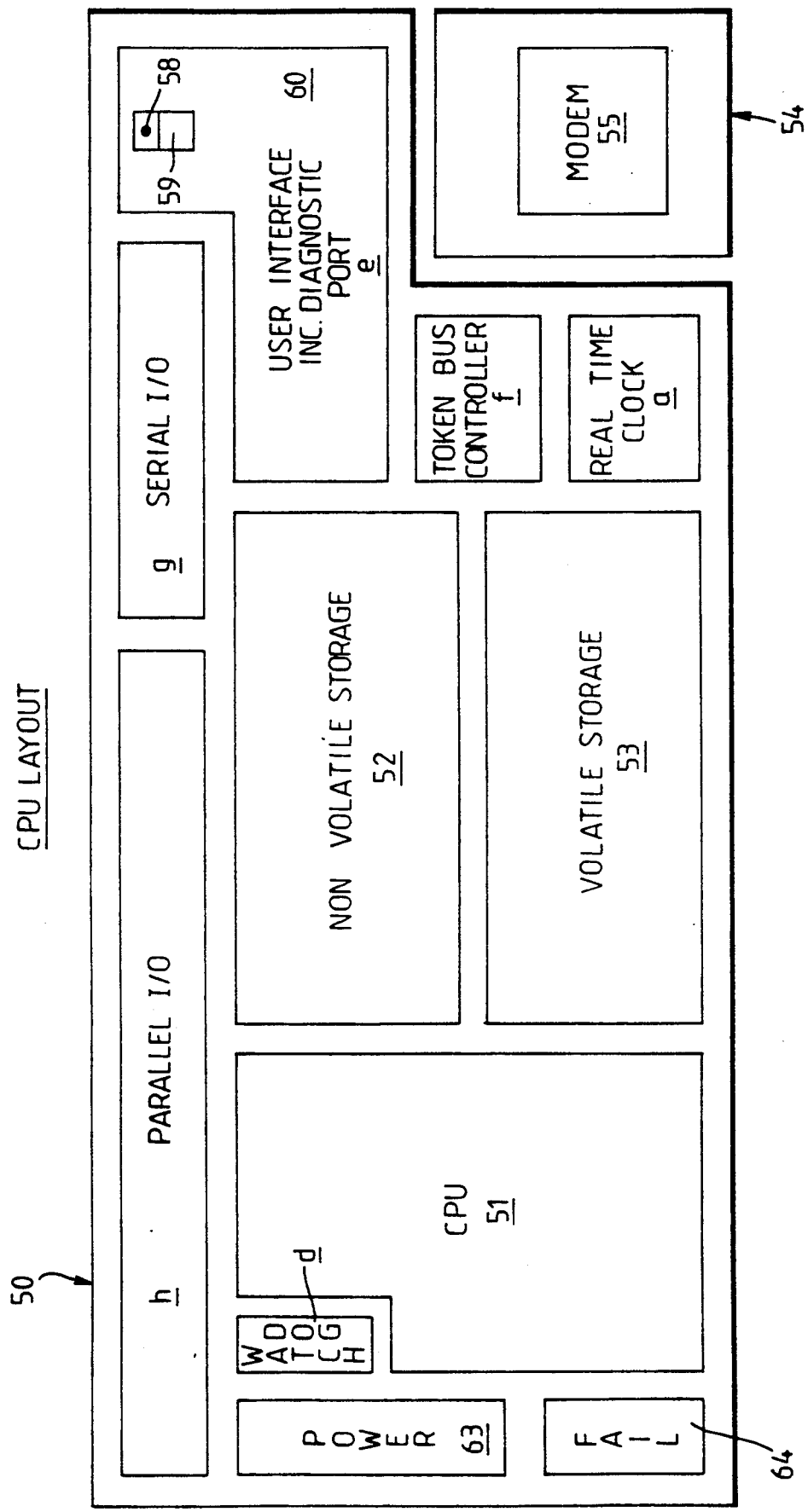
Figure 6:
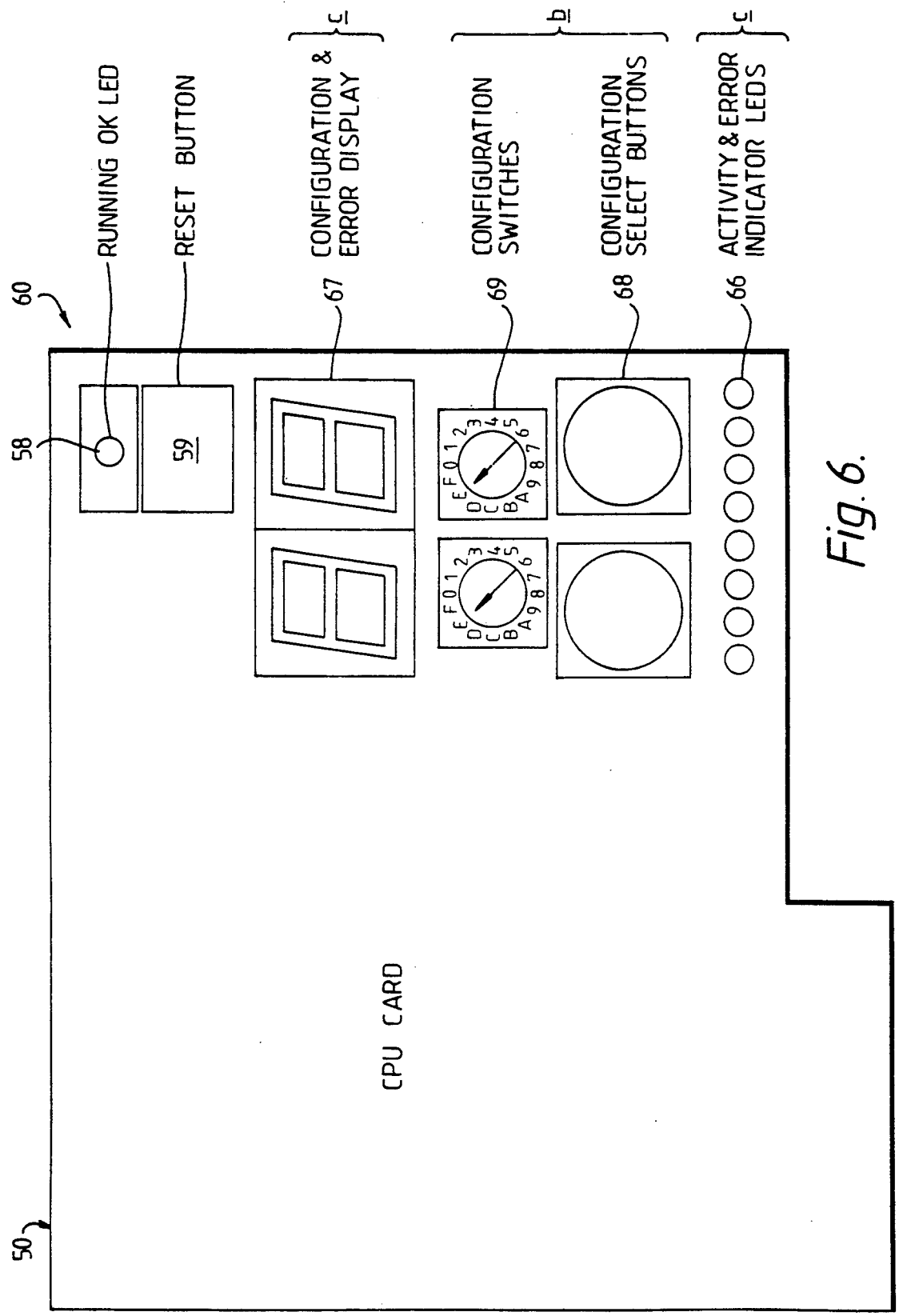
Figure 7:
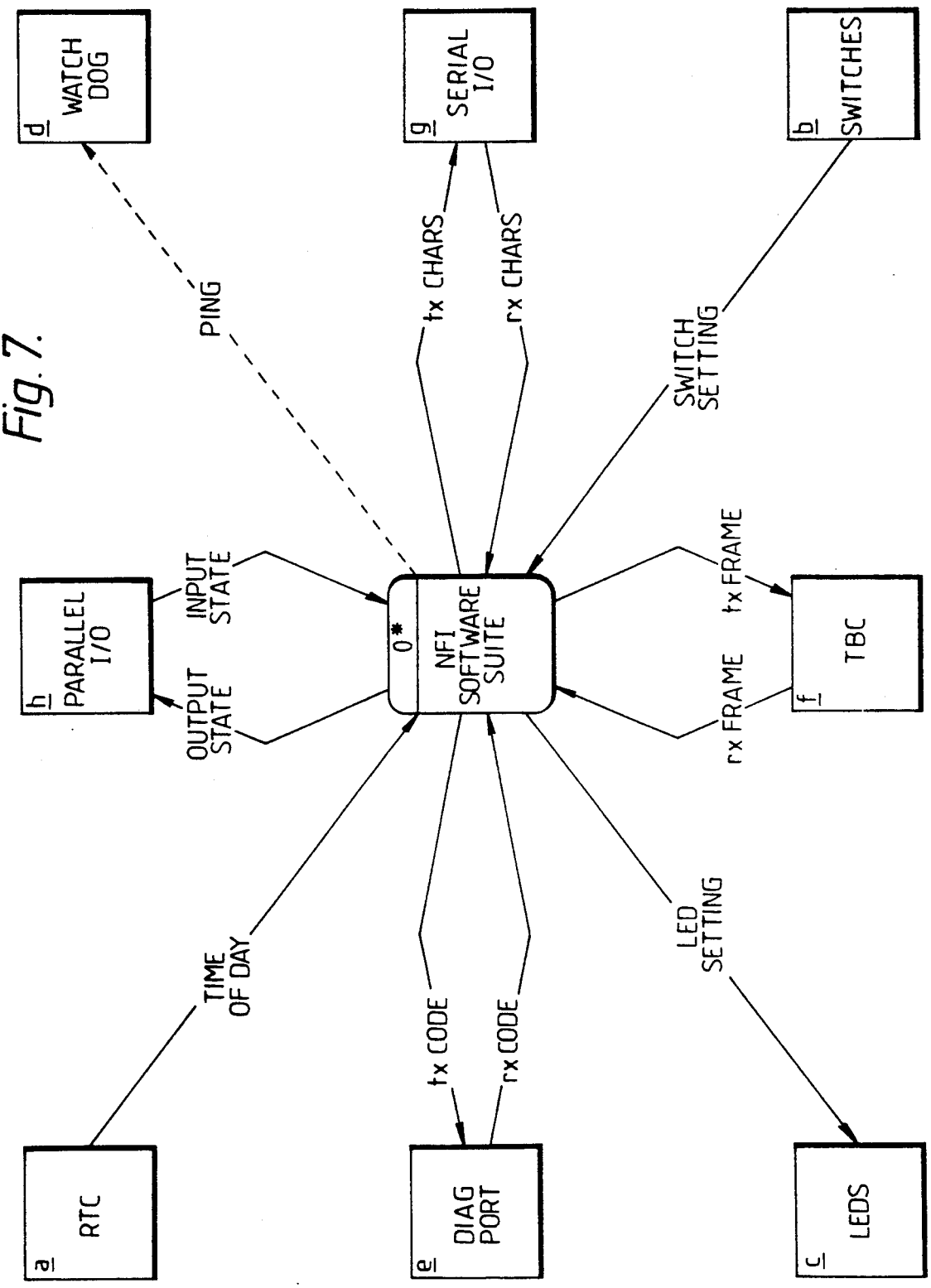
Figure 8:
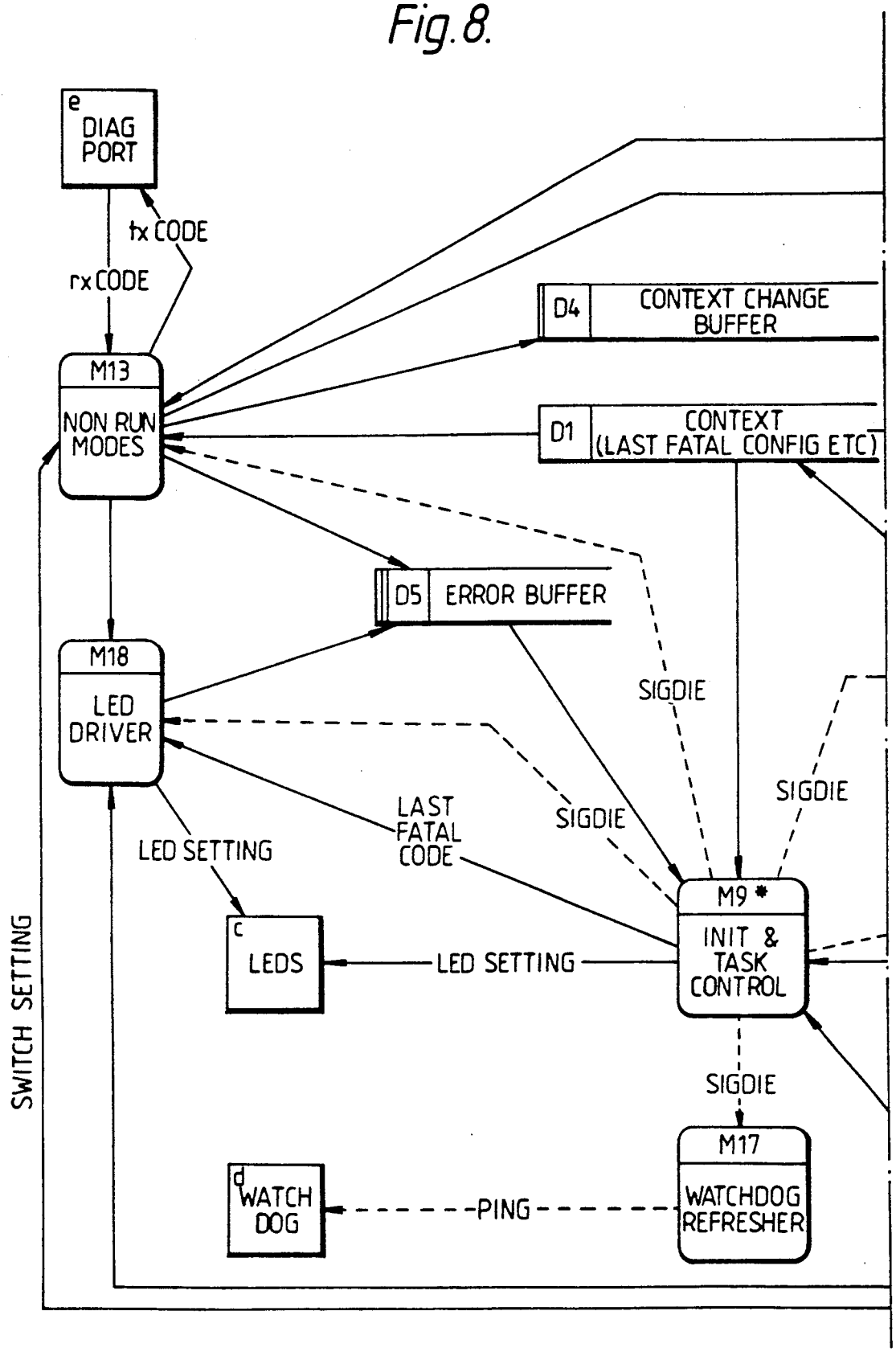
Figure 8:
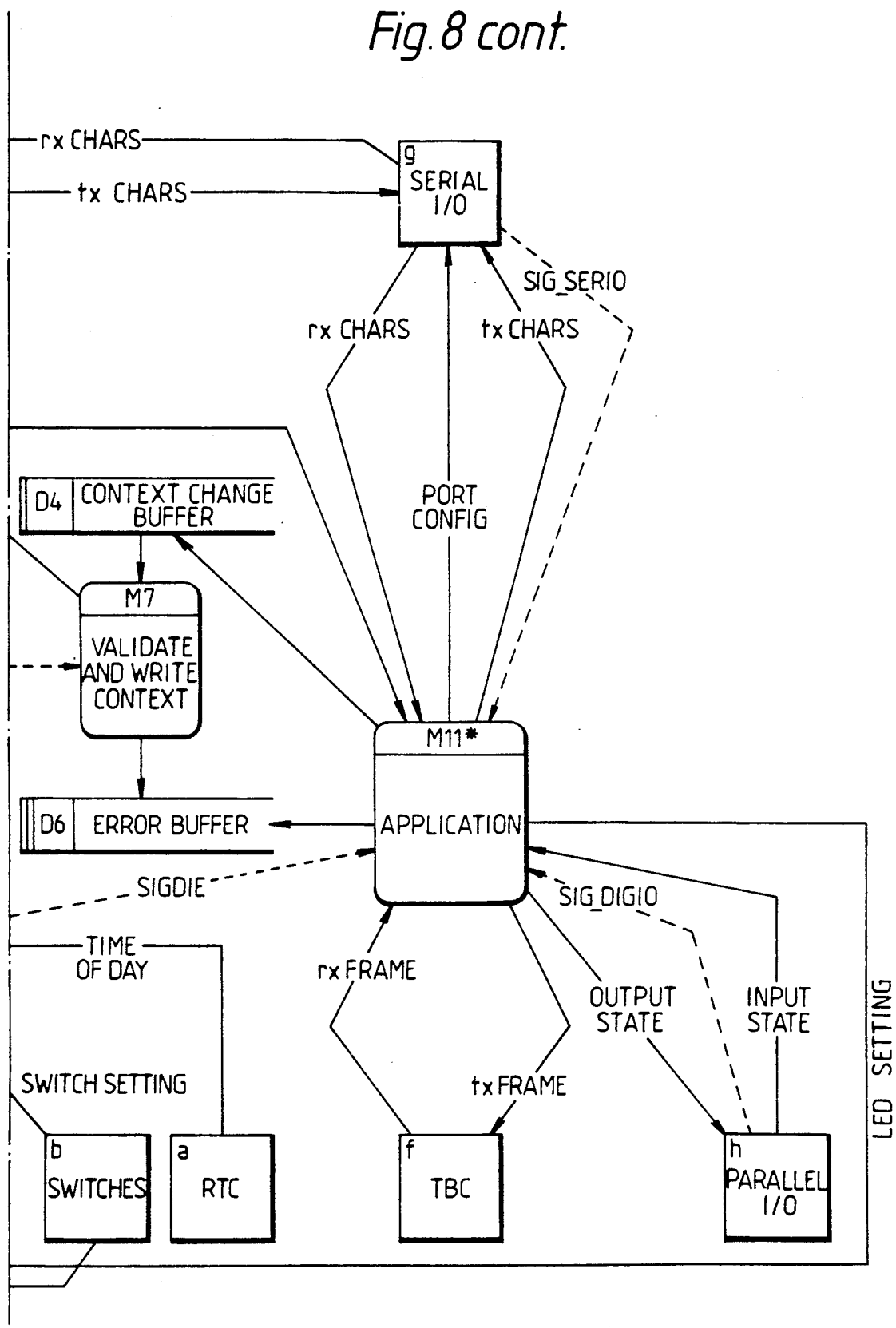
Figure 9:
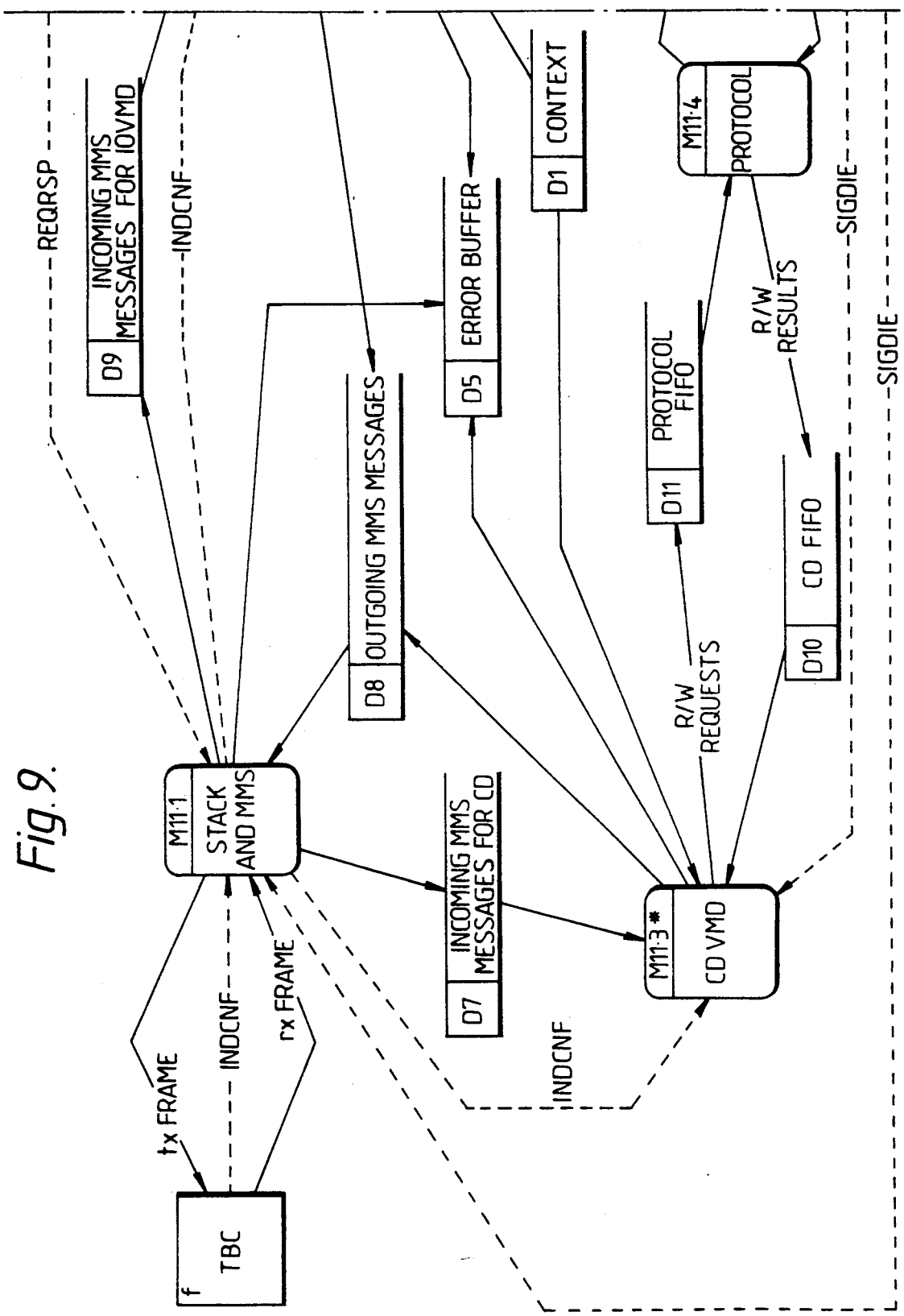
Figure 9:
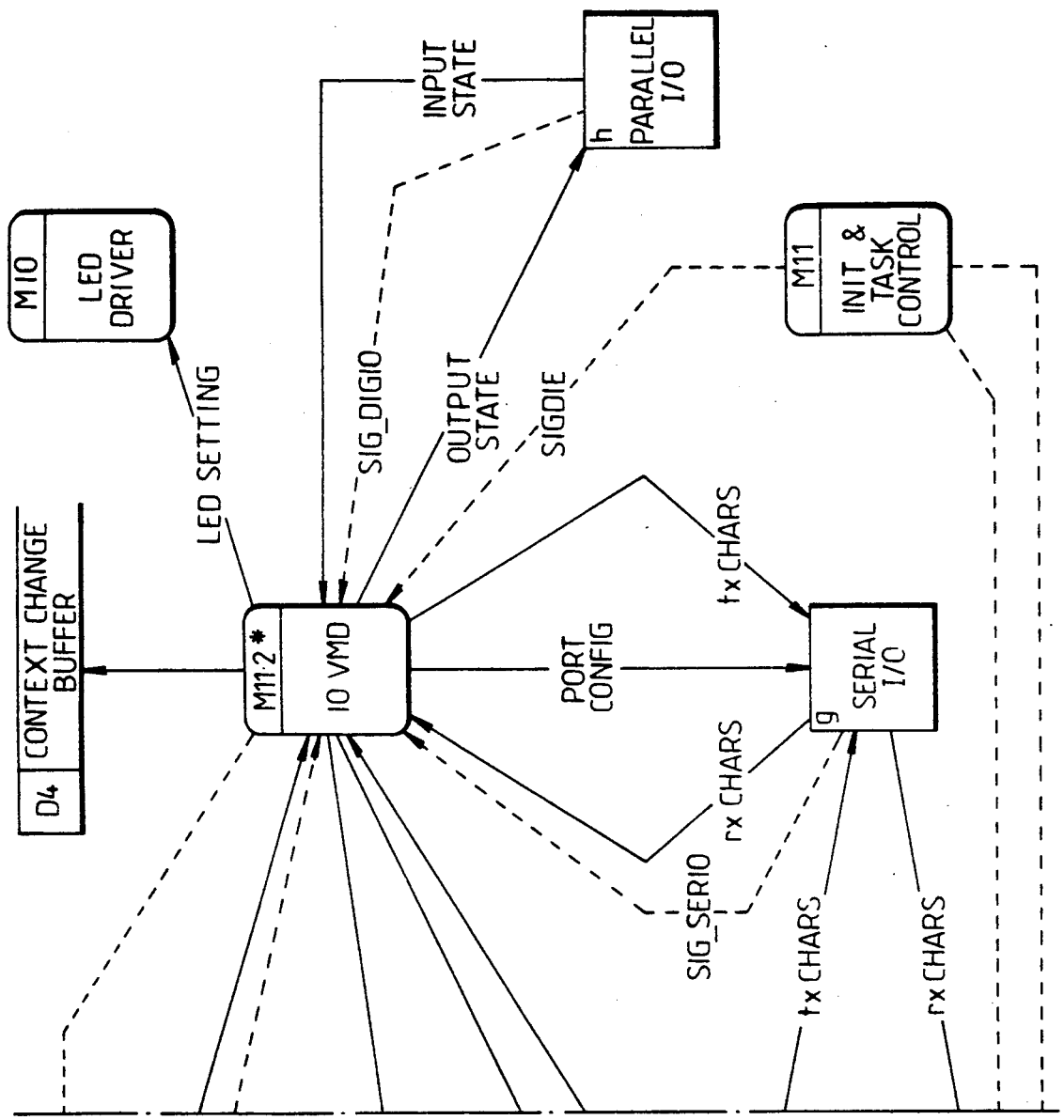
Figure 10:
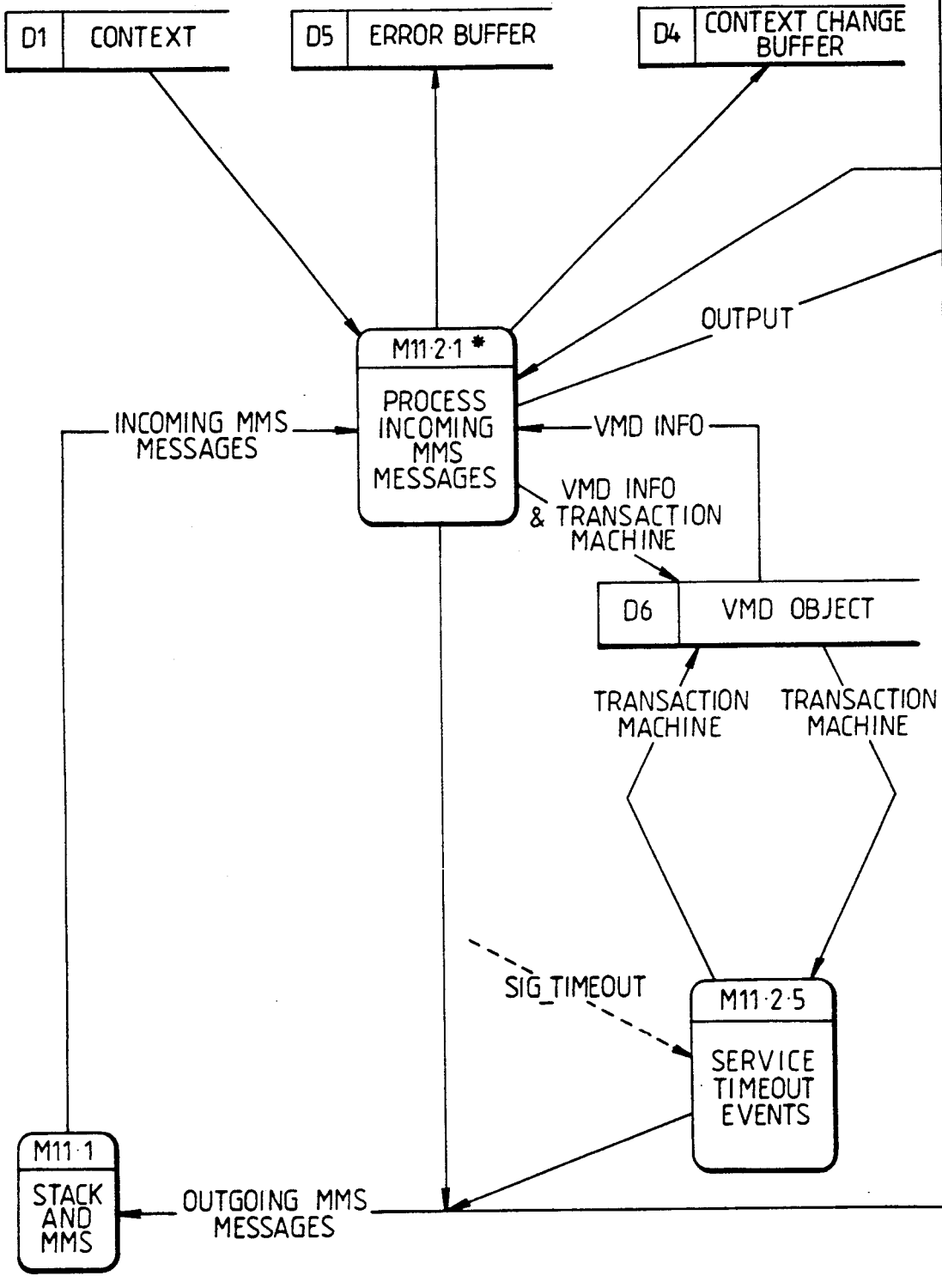
Figure 10:
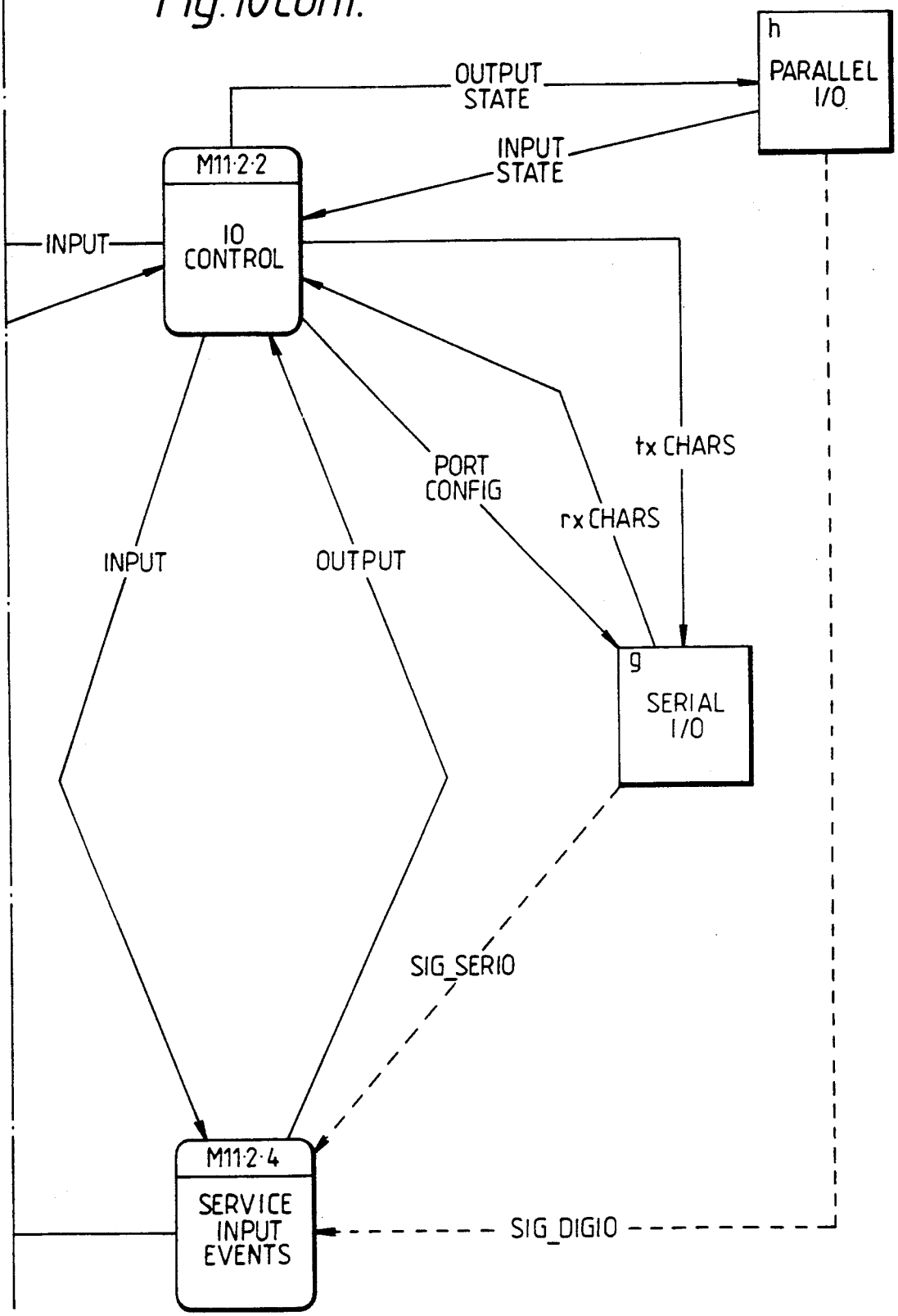
Figure 11:
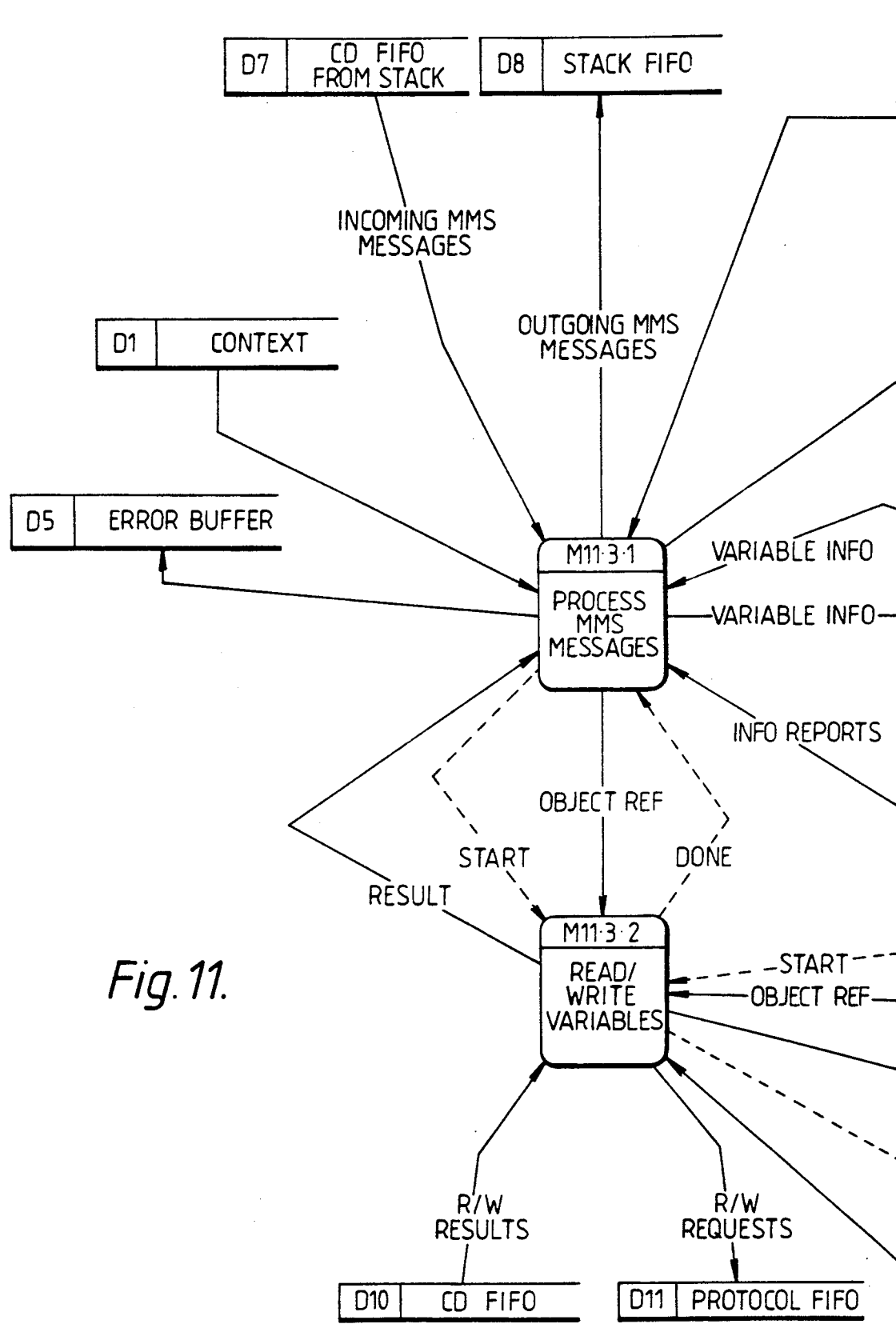
Figure 11:
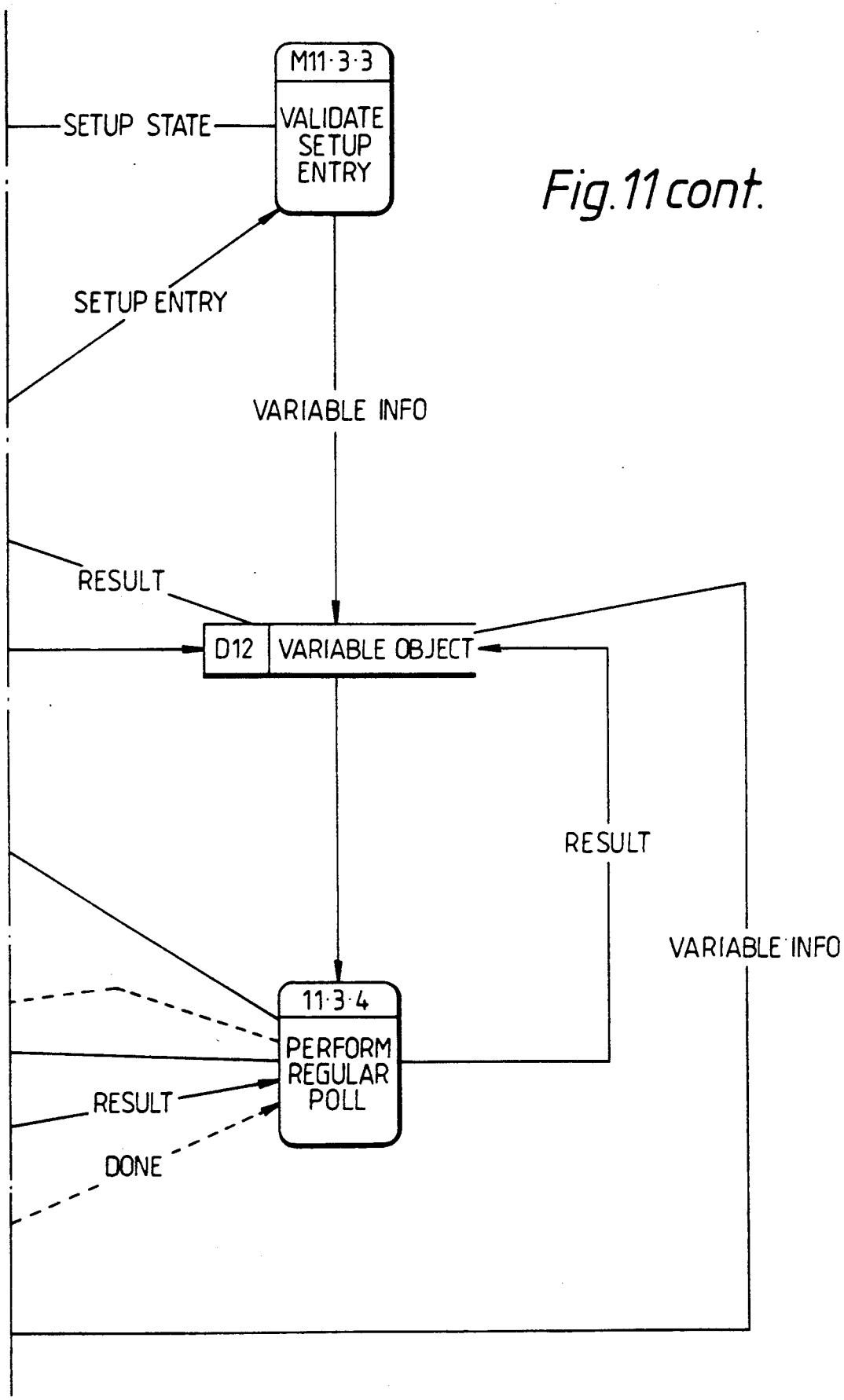

FIGS. 3 and 4 indicate the software functional organisation of an NFI with regard to its interaction with the network and its attached field devices;

FIG. 5 indicates the layout of the hardware components on the central processing unit (CPU) board in one of the NFI's;

FIG. 6 illustrates the user interface provided on the CPU board of FIG. 5;

FIG. 7 is a data flow context diagram showing how the NFI software suite interacts with the hardware components shown in FIG. 5;

FIG. 8 is a data flow diagram showing the major modules of the software suite of FIG. 7 and their interaction with each other and the hardware components of FIG. 5;

FIG. 9 is a data flow diagram showing software module 11 of FIG. 8 in more detail;

FIG. 10 is a data flow diagram showing software module 11.2 of FIG. 9 in more detail; and FIG. 11 is a further data flow diagram showing software module 11.3 of FIG. 9 in more detail.

Figure 1:
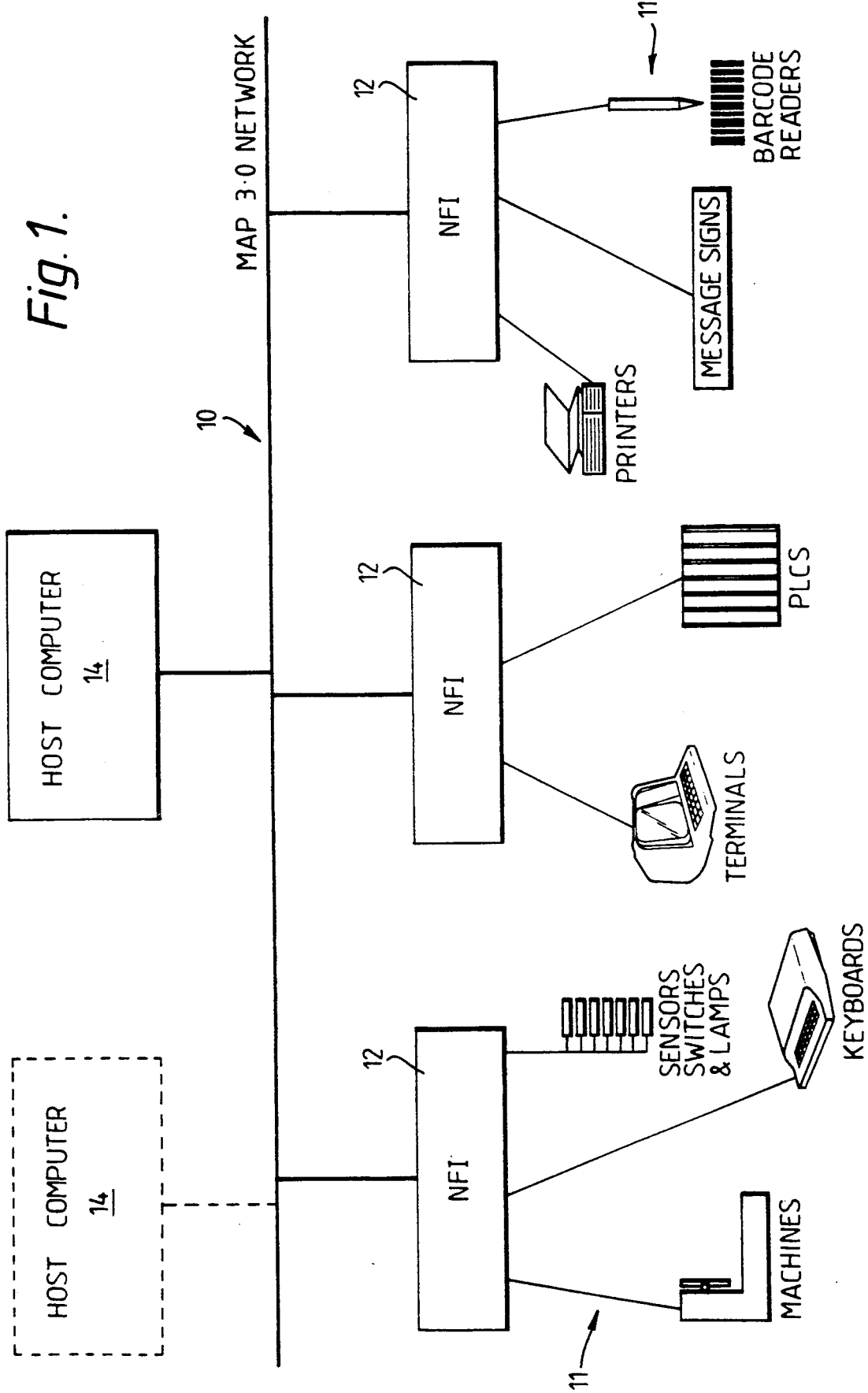
FIG. 1 illustrates a MAP network utilising NFI's in accordance with the present invention.

FIG. 1 shows a local area network intended for use in manufacturing or process control. It comprises a token bus communications network 10 conforming to the internationally recognised MAP standard using IEEE 802.4 carrierband or broadband technology. Various devices 11, such as those shown at the bottom of the figure, are interfaced to the network 10 by NFI's 12. One or more host computers 14 are connected to the network and provide the overall monitoring and control of the system and its devices 11. The host computers 14 may be mainframes, workstations or PCs, depending on the overall requirements of the system.

The host computers 14 use MMS services via the MAP network 10 directly to control or monitor the attached devices 11. As indicated in the Figure, the devices to be interfaced to the network may be of widely varying nature. The NFI's 12 translate the MMS service requests into the form necessary to access each specific device.

A carrierband or broadband network as mentioned above utilises coaxial cable. A possible alternative would use fibreoptic cabling for the network, with appropriate facilities for optical/electrical signal conversion.

Figure 2:
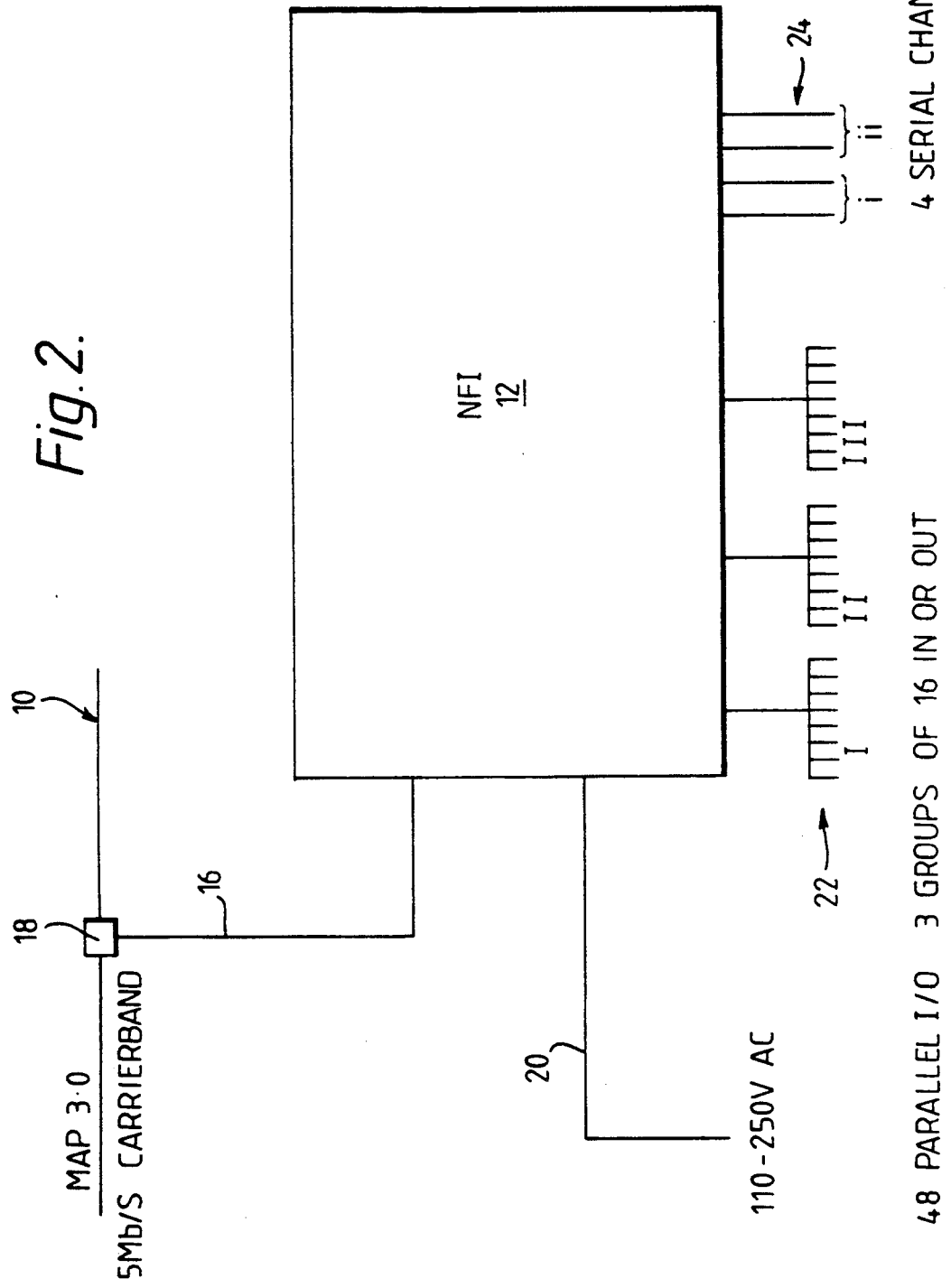
FIG. 2 illustrates the connections to one of the NFI's in FIG. 1.

FIG. 2 shows the physical connections to an NFI 12. These comprise a connection 16 to the MAP network 10 via a suitable tap 18, an A.C. power supply 20, forty eight parallel I/O field connections 22 and four serial field connections or channels 24. For convenience, the I/O connections 22 are in three groups I,II,III of sixteen in each group. Each group I,II,III may be configured to suit the voltage and current requirements of the attached devices. Furthermore, electrical isolation from field wiring is provided through optical isolation or relays. Similarly, we prefer that the 4 serial channels 24 are presented as two groups i,ii of two in each group with options for common serial communication standards, such as RS232, RS422 or current loop.

The NFI functions to present the state of its parallel and serial input and output connections 22,24 to the network, and consequently to the host computer(s) 14, as a set of data which can be read and written by those computers using the READ and WRITE services of MMS. In other words, the READ and WRITE services of MMS are mapped directly onto the physical I/O ports of the NFI.

In order to allow the host computer(s) 14 to manipulate the I/O, the software resident in the NFI 12 creates an entity called an Input/Output Virtual Manufacturing Device or IO VMD. This is capable of holding multiple simultaneous communications with different host computers. As indicated in FIG. 3 the IO VMD comprises a logical collection of three parallel I/O data sets, PAR1, PAR 2 and PAR 3, and four serial I/O data sets, SER 1 to 4. In the present example, using a MAP 3.0 network, the data sets are in fact MMS domains.

Each of the parallel MMS domains, such as PAR 1, comprises a sixteen element array of boolean values corresponding one-to-one with the members of one of the three groups of sixteen parallel I/O's, in this case the members of group I in FIG. 2. Each domain is also provided with a further boolean variable to indicate whether the sixteen connections in each corresponding group I,II, or III are currently inputs or outputs.

Similarly, the four serial I/O MMS domains, SER 1 to 4, correspond to each of the 4 serial channels. Each serial domain contains a set of variables which allows the serial channel to be monitored and controlled by the host computer. For example, there are variables representing the input and output buffers of the serial channel, and others representing the configuration of the channel, e.g. Baud rate, number of bits per character and stop bits. There is also a variable to indicate whether input data is available in the input buffer, and another to indicate the quantity of the input data.

Each of the NFI's four serial and forty-eight parallel channels within the IOVMD has I/O control "semaphore" data associated with it to allow host computers to coordinate their use of the NFI's I/O resources. Semaphores are a normal part of the MMS messaging system which runs on a MAP 3.0 network, but their application to the I/O control of the NFI is believed to be novel.

Essentially, semaphores comprise flag bits in data relating to operation of field devices attached to the I/O ports. Thus, a host computer may request notification of the presence of a certain semaphore and be prepared to wait a certain time to get it. The host computer will receive a positive MMS message if the semaphore becomes available in the specified time, otherwise it will receive a negative MMS message.

An example of the use of semaphores is provided by considering the case of two robots required to enter the same work space. In order to avoid a collision, the programmer of a host computer elects to control access to the area by the use of a semaphore. Only if the semaphore is present in the IOVMD serial I/O domain controlling use of the particular I/O port to which a robot is connected will the robot be allowed to enter the area. When the robot comes out of the area, the semaphore is passed via MMS to the I/O domain controlling the other robot.

Semaphores may also be used to request that MMS READ & WRITE services be delayed until a certain condition becomes true. Thus, the programmer of a host computer may modify the READ & WRITE services with a request to hold a semaphore indicating, e.g., whether a parallel input is ON or OFF, or whether a serial input is available. In conjunction with this, a timeout period for such modified services may be specified by the programmer, such that the READ or WRITE MMS service request will fail if the condition does not become true within the specified period.

An example of this use of semaphores to modify MMS messaging is provided by the case of a pick and place robot operating in conjunction with a conveyor belt. Suppose the conveyor belt is to move, say, 150 mm at a time, but only when a new component has been placed on its end by the robot. A START CONVEYOR command is obtained by setting one of the parallel OUT relays, but only when a semaphore released after previous operation of the robot has been passed to the relevant I/O domain element by the MMS. This semaphore is held in the I/O domain for the time taken for the conveyor to move 150 mm and is then released, whereupon the MMS passes it to the serial I/O domain controlling operation of the robot. Only while the semaphore is available at the serial I/O can the robot receive the "START CYCLE" signal from the MMS. The semaphore is released for passing back to the conveyor I/O when the robot cycle is completed.

Besides the IOVMD, two other types of VMD are provided by the software within the NFI 12, namely the CD VMD and the DOWNLOAD VMD, as shown in FIG. 4.

The CD VMD is provided to cater for attached devices which, although directly connected to the NFI, require a higher level of interface than provided by the direct I/O control of the IOVMD. For example, a PLC (programmable logic controller) might be attached to one of the serial channels but require the use of a communication protocol in order to access its internal data. Several CD VMD's may coexist within the NFI, typically one per serial channel, but they could conceivably be provided for the parallel connections as well, or instead.

The host computers 14 communicate with the CD VMDs using MMS READ and WRITE services to access the data as discussed for the IOVMD. However, whereas with the IOVMD the host computer accesses a pre-defined set of variables which equate directly with the physical connections of the NFI, in the case of the CD VMD the required data is actually within a connected device, so its type and quantity cannot be pre-defined. Consequently the CD VMD supports further MMS services to allow the host computer to dynamically create and delete definitions of variables within the CD VMD, and to specify the read and write access mechanisms for each variable.

The read and write access mechanisms are sets of control data to be used by a suitable protocol program running in the NFI. When the host computer requests variables within the CD VMD to be read or written, the CD VMD passes the corresponding set of control data to the protocol program. The protocol program interprets the control data and performs the necessary dialogue with the attached device in order to read or write the variable within that device. If it is required to read data from the attached device, the CD VMD will await a response from the protocol program (which samples the value of the variable), before formulating its reply to the host computer.

In order to reduce the potentially lengthy access time of a read request, the CD VMD has the ability to continuously and automatically poll specified variables on a regular basis, thus setting up a sample and hold mechanism, as described in more detail later. In this case, a read request from the host computer will be immediately satisfied when the CD VMD returns the last sampled value of the variable.

The NFI should be pre-programmed with a set of standard protocol programs for commonly used protocols. It is then possible, using a specially provided user interface described below, to choose which protocol program to use for each CD VMD and its corresponding serial channel.

The DOWNLOAD VMD is simply an extra facility which allows the user of the NFI to generate his own programs, for example protocol programs for the CD VMD, and download them to the NFI from the host computer when appropriate.

Having briefly described how the software provided in the NFI appears as an appropriate Virtual Manufacturing Device, the major hardware components of the NFI will now be described with reference to FIG. 5.

The NFI's main circuit board is a 68010-based CPU card 50. This holds a powerful data processor CPU 51, which executes the NFI's resident software suite, held in non-volatile storage 52. Our preferred CPU is a Motorola MC 68010P in a plastic 64-pin DIL package. This uses NMOS technology and has a clock speed of 10 MHz. The non-volatile storage 52 preferably comprises two components. The first is a 1M byte EPROM to hold the CPU's boot code and the basic control software to implement VMD communication with the network. The EPROM size could be increased up to 2M byte if required. The second is an 8K byte EEPROM used to hold configuration data such as network address, baud rates, etc.

Further memory is provided by volatile storage 53, preferably in the form of a 2M byte dynamic RAM, which is used to hold NFI run time data, plus programs downloaded to the NFI from a host computer on the network. The 2 Mbyte capacity is preferably accessed in word-wide format for optimum speed.

Also of prime importance on CPU card 50 is a token bus controller f which cooperates with a carrier band token bus modem 55 on a separate circuit board 54 for enabling and facilitating communication with the MAP network. We specify the Motorola MC68824RC10E 10 MHz token bus controller and the Siemens SAB 82511-5NE carrier band modem chip. Besides the modem chip, the modem 55 also consists of the required modem support circuits and also connectors for the token bus controller f and the network. However, self-contained, preassembled modem units are also readily available as an alternative. Such preassembled units do not require the support circuits on board 54 provided for the Siemens chip and they may be carrier band, broad band or fibre optic modems if desired for connection to carrier band, broad band or fibre optic networks. Suitable modems are available through Computrol Inc., 239 Ethan Allen Highway, Ridgefield, Conn. 06877-6297, USA.

The CPU card 50 is further provided with a real time clock a which provides reference timing for the operation of the rest of the components and the VMD programs. It injects time signals onto the data bus which links those components of the NFI which need to send and receive data. We prefer to power the clock from a non-rechargeable lithium battery having a life of about 10 years at room temperatures. A suitable clock a has the supplier designation ICM 71701PG.

In order to provide a way of detecting a corrupt program and to get the NFI restarted without manual intervention, a watchdog circuit d, as known to the skilled person, is included to monitor operation of the CPU 51. Inputs to the watchdog d are software SET and RESET reports from the CPU I/O port, whereas output from the watchdog is a drive to an associated relay (not shown), and a signal which effects a complete reset of the CPU. Also output directly from the watchdog d is a voltage signal to a "running O.K." light-emmitting diode (LED) 58 which is mounted on a manual reset switch 59 as part of a user interface 60 to be described in detail below. While the CPU 51 is running, the watchdog keeps the relay contacts open and the LED illuminated, but when it detects an error in the operation of the software, as described later, it allows the relay contacts to close, turns off the LED 58 and resets the CPU 51.

To communicate with devices attached to the NFI, programmable parallel and serial I/O integrated circuits h,g respectively are provided.

Parallel I/O area h comprises three integrated circuits catering for forty-eight digital channels in three groups of sixteen as previously described. Each integrated circuit is connected to a corresponding sixteen-channel digital input/output board (not shown). Each board can be configured for either input or output and the individual channels can be matched to the requirements of the field devices to be attached to them. This matching step is performed by means of plug-in modules sold by Opto 22 of 15461 Springdale Street, Huntingdon Beach, Calif. 92649, USA. These provide a range of interfaces from 5 volts DC to 250 volts AC at 3 amps. Our preferred integrated circuits h are Zilog Z0853606PSC.

Serial I/O area g comprises two integrated circuits catering for four serial channels in two groups of two as previously described. The integrated circuits are connected to two corresponding serial input/output boards (not shown). Each board provides two reconfigurable isolated current loop channels using four-wire connections and capable of handling, say, 20 mA. Because it is reconfigurable, each channel can be selected to be either active or passive in transmitting or receiving, in any permutation. Alternatively, the two I/O boards may be RS232 or RS422 channels. Our preferred integrated circuits g are Motorola MC68681P.

Due to the above I/O provisions, the NFI can be used to connect to a MAP network such serially connected devices as so-called "dumb" terminals, barcode readers, computer numerically controlled machine tools, robots, programmable logic controllers and automatically guided vehicles. It can also take parallel inputs from voltage free switches, relays and AC sources, and give parallel outputs to relay coils, lamps and AC machines.

Power is supplied to CPU card 50 through a power supply 63, designed to provide +5 volt DC outputs at 6 amps to the cards 50,54 and to each I/O board. It can also supply +12 volts DC at 2 amps for the alternative modems mentioned previously. It is capable of maintaining these outputs correctly even if its own mains supply is interrupted by the removal of up to one complete mains cycle, or if the mains supply voltage and sine wave frequency vary over defined ranges.

In the event of an actual mains power failure adversely affecting the +5 volt DC outputs of the power supply 63, power fail detection circuitry 64 is provided on CPU card 50 in order that the CPU 51 and other IC's should experience a controlled shutdown. Power fail detector 64 detects when the mains supply is approaching a critical state where the stabilised outputs will vary beyond allowable levels, and sends an interrupt signal to the CPU 51 which RESETS the CPU and holds it in RESET all the time that the +5 VDC outputs are outside their allowable levels, and for a short time after allowable levels are regained.

Finally, as already mentioned, the CPU card 50 holds the User Interface 60, shown in more detail in FIG. 6, which is intended to provide the user with the following capabilities:
- to select the NFI's operational mode and to perform the initial installation and setup functions
- to tailor the NFI's configuration to the user's requirement
- to monitor the activity of the NFI's I/O resources
- to report the result of diagnostic checks and to report errors during normal use.

The intention in the design of the User Interface 60 is to enable the NFI to be a factory-floor product which allows the user to fully configure the NFI but without requiring additional equipment (e.g. terminals). It is therefore designed to be relatively simple to use.

It consists of a row of eight discrete LED's 66 to indicate the activity of the NFI, two seven-segment LED hexadecimal displays 67 to display values of data and the NFI's operational status, two push-button switches 68 to enable the user to select and alter values displayed on the seven-segment LED's 67, two 16-position (hexadecimal) rotary switches 69 to enable the user to select the mode of operation of the NFI, and a master reset push-button switch 59, already mentioned, which incorporates the single LED 58 to signal correct operation of the CPU 51.

In addition to monitoring and utilising the controls and indicators shown in FIG. 6, the software associated with the user interface 60 also enables one of the serial I/O ports to be used as a diagnostics port, to which a suitable device, such as a desktop computer or terminal, can be attached in order to request the NFI to perform built-in self-diagnosis tests and display the results.

Operational Modes

Rotary switches 69 can be set to give a total of 256 possible settings. The results of the settings are dependent upon the programs installed in the NFI, and are used for selecting operational modes of the NFI. Normally, the selected mode does not become active until reset button 59 is pressed. The range of settings for switches 69 is preferably split into functional groups, as shown in Table I, for example.

TABLE I

| 00–0F | Normal network operation |
|---|---|
| 10–1F | Diagnostics, Installation & Configuration |
| 20–FF | Reserved for configuration parameters |

These ranges are merely exemplary and are readily reconfigurable.

In fact, many of the settings in these functional groups will not be needed for most purposes, and will therefore be unused unless special programs are installed requiring their use.

Normal Network Operation Mode

The NFI is designed to start automatically when power is applied, and may be re-started at any time by depressing the reset button. Care should be taken when re-starting the NFI, as any network activity being undertaken by the NFI will be abruptly terminated. This may adversely affect software being run elsewhere on the network.

To select the normal network operation mode, the user selects a switch setting in the range 00 to 0F and presses the reset button 59 to start the NFI. It is usually arranged that the switch setting for normal network operation is 00.

Also during normal network operation, the eight discrete LED's 66 display the state of the NFI's I/O resources as shown in Table II.

TABLE II

Leftmost LED
* NFI is part of network (Flashing)
* Activity on Parallel board 1 (rate of flash indicates activity)
* Activity on Parallel board 2 (rate of flash indicates activity)
* Activity on Parallel board 3 (rate of flash indicates activity)
* Activity on Serial board 1 (rate of flash indicates activity
* Activity on Serial board 2 (rate of flash indicates activity)
* Activity on Serial board 3 (rate of flash indicates activity)
* Activity on Serial board 4 (rate of flash indicates activity)
Rightmost LED

Diagnostics, Installation and Configuration Modes

The diagnostic mode is started by selecting switch setting 10 and pressing the reset button. A particular diagnostic is selected through a terminal or desktop computer as mentioned previously, which displays the result. Meanwhile, the bank of 8 discrete LED's flash rapidly to indicate that configuration mode is enabled.

The NFI holds a number of configuration parameters in non-volatile memory 52 (EEPROM). These values are used by the NFI at start-up time to determine the software to be run and the network characteristics.

Each parameter consists of one or more bytes (8 bits) of data. The user can check or alter parameters on a byte-by-byte basis.

Configuration mode is selected by positioning the rotary switches to a value in the Reserved range 20 to FF while the discrete LED's are flashing as described above. The setting of the rotary switches directly references a single byte of configuration data.

Once configuration mode is selected as above, the two 7-segment LED's display the current value of the selected byte. By rotating the two rotary switches to other values in the range 20 to FF, other parameter values may be viewed.

Note that once configuration mode has been enabled, it is not necessary to press reset again until configuration is finished.

Should the switches be set to an invalid value (i.e. in the range 00 to 0F) after start-up in configuration mode, the two 7-segment LEDs are blanked. They light again when a valid selection is made.

The user may change the value of the byte on display by use of the two push-buttons 68. The left and right push-buttons alter the value of the left and right 7-segment LEDs respectively. By pressing and releasing a push button once the corresponding digit is incremented. Note that after reaching 'F' the digit returns to '0' and starts the count again.

One or more of the range of settings 10 to 1F may be used for debug tasks, for which a terminal may be attached to one of the serial I/O ports in order to investigate problems.

Although the user interface 60 has been described as being on the main CPU board 50, manufacturing convenience in a fully productionised version is better served by mounting the interface 60 on its own card separate from the CPU card.

The software suite controlling operation of the NFI and its user interface 60 will now be discussed in more detail.

SOFTWARE DATA FLOW DIAGRAMS

The diagram shown in FIG. 7 shows the software context diagram for the NFI. The software receives time of day information from the Real-Time Clock, RTC, reference a. Diagnostic information (tx code), i.e. results of self diagnostic tests, is sent to a suitable attached device through the DIAG PORT, e. The NFI also receives diagnostic requests (rxcode) which control the self diagnostic tests to be performed.

Status of the NFI is displayed on the LED display c (66,67,FIG. 6) by sending LED setting data to the LED's.

The MAP network interface is effected through a Token Bus Controller (TBC), f. Data to be transmitted on the network (tx frame) is sent to the TBC, and data from the network (rx frame) is received from the TBC.

The configuration of the NFI is selected by switches b (68,69,FIG. 6) which are sampled by the NFI software.

The NFI sends (tx chars) and receives (rx chars) from the serial I/O channels It controls the state of parallel outputs by sending the required output state data to the parallel I/O h . Similarly, the NFI software can detect the current state of the parallel inputs by reading the input state from the parallel I/O h.

Finally, the NFI software ensures resilience against internal failure or intermittent hardware failure by repeatedly sending a "PING" signal to a hardware watchdog circuit d. Should the watchdog fail to receive a "PING" signal within a specified period, it will cause a complete hardware reset of the NFI. This is equivalent to switching the unit off and then on again.

FIG. 8 shows the NFI foundation software data flow diagram. The foundation software consists of several modules, shown as numbered rectangular boxes with rounded corners. These modules exchange data directly, and also through data stores D1, etc. The modules further exchange control signals to synchronize execution.

The data stores D act as First In First Out (FIFO) buffers. Multiple modules are able to write data to a buffer, but only one module ever reads data from it.

The CONTEXT CHANGE BUFFER D4 receives requests for changes to the NFI's non volatile storage. The VALIDATE AND WRITE CONTEXT module M7 reads requests from the FIFO D4 and updates the non volatile storage CONTEXT D1 with configuration data for the NFI, this data being needed on start-up of the machine after switching off.

The ERROR BUFFER D5 receives error information from most modules, while the INIT & TASK CONTROL module M9 reads this information and halts and restarts other program modules if necessary. It achieves this by sending a coordination signal SIGDIE to any modules which must halt. This module is also responsible for the initial reading of data from the switches b and CONTEXT D1 and determining the appropriate program modules to execute. It also reads the Real-Time Clock a. In the case where the module M9 detects a fatal error in the software it will display the error code on the LED's c and send the SIGDIE signal to the WATCHDOG REFRESH module M17. This will consequently cause a complete hardware reset of the NFI.

NON-RUN MODES module M13 allow maintenance personnel to exercise the NFI's inbuilt self diagnostics and configuration capabilities. It uses the switches b and the LED's c to allow the user directly to modify the contents of the CONTEXT buffer D1, and therefore the NFI's configuration, as outlined previously. This module accesses the diagnostic port e, LEDs c and serial I/O g depending on the mode selected. Any errors detected during the diagnostics are stored in an ERROR buffer D5, so that they may be examined later.

The data flow diagram in FIG. 9 shows the APPLICATION software module M11 in more detail. The APPLICATION module consists of a STACK & MMS module M11.1 together with one or more VMD modules M11.2-11.4. The VMD modules correspond to the VMD's described earlier.

The STACK & MMS module M11.1 fully implements the MAP protocol including MMS. It receives and transmits data to the MAP network via the TBC f (rx frame & tx frame), receiving a SIGNAL (INDCNF) from the TBC when data frames have arrived. This interrupt driven mechanism provides the most efficient coupling between the MAP network and the module M11.1.

The STACK & MMS module M11.1 communicates with the VMD modules through FIFO buffers D7, D8 and D9. There is a single buffer D8 for all data flowing to the STACK & MMS module, and one FIFO buffer D7,D9 for each VMD to receive data from the STACK & MMS module. A VMD will send a REQRSP coordination signal to the STACK & MMS module whenever it has placed data OUTGOING MMS MESSAGES into the FIFO buffer. Once again the use of the coordination signal allows the STACK & MMS module to operate with maximum efficiency. Similarly, when the STACK & MMS module places data INCOMING MMS MESSAGES into the VMD's FIFO buffer D7 or D9 it sends a coordination signal INDCNF to the VMD modules M11.2 or 11.3.

Should the STACK & MMS module M11.1 or a VMD module encounter an internal error during normal operation, they will place error report data into the ERROR BUFFER D5. The INIT & TASK CONTROL module M9 receives the report as shown in FIG. 8 and may consequently decide to terminate one or more modules by issuing the SIGDIE coordination signal. The STACK & MMS and VMD modules may therefore receive the SIGDIE coordination signal at any time and consequently terminate execution in a controlled manner.

The IO VMD module M11.2 sends configuration change requests to the CONTEXT CHANGE buffer D4. This allows the required line disciplines for the serial channels to be adjusted, for example Baud rate, bits per character etc. It also sends LED SETTING information to the LED DRIVER M18. This allows the IO VMD M11.2 to use the LED's as activity indicators for each of the serial I/O channels g and parallel I/O boards. This gives a clearly visible indication to the NFI user that the unit is active. Conversely, inactivity on one or more LEDs may be used as an indication that the host computer has stopped communicating with the corresponding attached device.

In addition to the foregoing tasks, the IO VMD reads data from the CONTEXT buffer D1 to determine the required configuration of the I/O interfaces and sends PORT CONFIG data to the SERIAL I/O g to establish the required line disciplines (Baud rate, parity etc.). It sends data to be transmitted by the SERIAL I/O (TX CHARS), and receives data (RX CHARS) from the SERIAL I/O. A coordination signal SIG_SERIO is sent by the SERIAL I/O to the IO VMD when received characters are available.

With regard to the control of the PARALLEL I/O h by the IOVMD, data OUTPUT STATE is sent in order to switch individual output lines on or off. Similarly, INPUT STATE data is read from the parallel I/O to determine the current state of each input line.

A coordination signal SIG_DIGIO is sent to the IO VMD by the PARALLEL I/O whenever one or more PARALLEL input lines change state.

As can be seen from the above description, the IO VMD module M11.2 receives coordination signals from all external data sources. This interrupt driven mechanism allows the IO VMD to operate with maximum efficiency.

The CD VMD module M11.3 interfaces to the STACK & MMS module 11.1 in a similar manner to the IO VMD, but differs in that it does not directly access the SERIAL I/O g but rather uses an intermediate PROTOCOL module 11.4, to handle all I/O requests. The mechanism for linking the CD VMD to the PROTOCOL module is once again based upon FIFO buffers D10, D11. When the CD VMD requires data to be read from or written to an attached device, it places a request R/W REQUESTS into the PROTOCOL FIFO D11 for the PROTOCOL module M11.4. Once the PROTOCOL module has completed the transaction it will place the response data R/W RESULTS into the CD FIFO D10 for the CD VMD.

The CONTEXT buffer D1 is read by the CD VMD to determine which part of the PROTOCOL module should be used by the CD VMD.

FIG. 10 shows the internal structure of the IO VMD module M11.2 in more detail.

MMS service requests from the host computer, including semaphores, are received via STACK & MMS module M11.1 by module M11.2.1 PROCESS INCOMING MMS MESSAGES. This segregates the requests into three categories. Those which cannot be satisfied at all (perhaps because they are incorrectly structured requests), are immediately rejected by formulating and despatching a negative response OUTGOING MMS MESSAGES to the host computer via module M11.1 and the network.

Those requests which can be immediately satisfied are passed on to the I/O CONTROL module M11.2.2. This will perform the appropriate action and return information to indicate success or failure and data values. The PROCESS INCOMING MMS MESSAGES module will then formulate and despatch an appropriate reply OUTGOING MMS MESSAGES to the host computer.

Those requests which cannot be satisfied immediately will be placed into a transaction queue within the VMD OBJECT store D6. The module 11.2.5 SERVICE TIMEOUT EVENTS monitors the queue of unsatisfied requests. Should any request fail to be satisfied within a timeout period (which may be specified in the request), a negative response will be formulated and despatched to the host computer. Coordination signal SIG_TIMEOUT is used to indicate that a timeout period has elapsed.

The PROCESS INCOMING MMS MESSAGES module M11.2.1 makes reference to the CONTEXT buffer D1 to determine the current state of SERIAL I/O line disciplines and writes data to the CONTEXT CHANGE BUFFER D4 should the MMS service request indicate that the value is to be altered. The module will also report any erroneous requests to the ERROR BUFFER D5.

The module M11.2.4 SERVICE INPUT EVENTS receives coordination signals SIG_DIGIO and SIG_SERIO from the PARALLEL and SERIAL I/O, which indicate that input is available. When a coordination signal occurs it scans the list of unsatisfied requests to determine if the request was dependent upon the change of state indicated. If so, the necessary reply is formulated and despatched to the host computer as OUTGOING MMS MESSAGES.

As previously mentioned, the IO CONTROL module M11.2.2 is responsible for direct control of the PARALLEL and SERIAL I/O resources. It sends data (TX CHARS) to, and receives data (RX CHARS) from, the serial channels. It also configures the required line discipline (bits per character, stop bits etc) PORT CONFIG, for each channel. It also controls the required output state of each parallel line OUTPUT STATE, and reads the state of each parallel input INPUT STATE.

FIG. 11 shows the data flow diagram for the CD VMD module M11.3 (FIG. 9). There is a module M11.3.1 PROCESS MMS MESSAGES which is virtually identical to the module M11.2.1 PROCESS INCOMING MMS MESSAGES in the IO VMD module M11.2.

Requests which cannot be satisfied (perhaps a request for access to a variable which has not yet been defined), are rejected by formulating an error response and despatching it to the host computer as an OUTGOING MMS MESSAGE via the STACK FIFO D8 (see also FIG. 9).

Requests which can be satisfied immediately are those to read variables for which a periodic poll (sample and hold) system has been established as described below. In this case the hold value is assembled into a response and despatched to the host computer as an OUTGOING MMS MESSAGE.

Requests which cannot be satisfied immediately are passed to the module M11.3.2 READ/WRITE VARIABLES. This calls upon the services of the PROTOCOL module M11.4 via the PROTOCOL FIFO D11 as described earlier to execute the request in the attached device. When the PROTOCOL module has finished it returns a value via the CD FIFO D10 to indicate success or failure and data value (in the case of reading). Once again this is formulated into a reply and despatched to the host computer.

In addition to these functions the module M11.3.1 also accepts MMS requests to create and delete new variable definitions. In order to accomplish this it calls upon the services of module M11.3.3 VALIDATE SETUP ENTRY to ensure that the request is correctly formulated and that no identically named variable already exists. If all is well an entry is made in the VARIABLE OBJECT store D12, which contains all data pertaining to each variable.

The module M11.3.4 PERFORM REGULAR POLL calls upon the services of the module READ/WRITE VARIABLES M11.3.2 in the same way as module M11.3.2 PROCESS MMS MESSAGES does, to read the state of those variables for which polling (sample & hold processing) has been specified. The latest value of the variable is stored in the VARIABLE OBJECT store D12 for later reading by the host computer. If a variable has been declared with a requirement to notify the host computer should a change in hold value occur, the module will send INFO REPORT data to the PROCESS MMS MESSAGES module M11.3.1, which will assemble the data and despatch it to the host computer as before.

I claim:

1. A network-field interface, hereinafter referred to as an NFI, intended for digitally interfacing at least one host computer on a network to at least one field device, the network operating with a predetermined communications protocol including READ and WRITE services, the NFI comprising:
    (a) I/O port means for connection to the at least one field device and including at least one parallel I/O port and at least one I/O serial port;
    (b) communication means to facilitate communication between the network and the interface;
    (c) data processing means;
    (d) memory means accessible to both the communication means and the data processing means; and
    (e) program means resident in the memory means and executable by the data processing means to map the READ and WRITE services onto the I/O port means, said program means including means for creating a respective data set corresponding to said at least one parallel I/O port and a respective data set corresponding to said at least one serial I/O port, the parallel I/O data set including a multi-element array of boolean values corresponding to the parallel I/O port and also including a further boolean variable to indicate whether the connections in its parallel I/O port are inputs or outputs, whereby the host computer is able to READ and WRITE directly to the I/O port means through the communication means.

2. An NFI according to claim 1 in which the I/O port means for the at least one field device comprises a plurality of parallel I/O ports and a plurality of serial I/O ports, the program means containing means for creating respective corresponding parallel I/O data sets and serial I/O data sets for the plurality of parallel I/O ports and the plurality of serial I/O ports as appropriate for the network communications protocol.

3. An NFI according to claim 2 in which each of the serial I/O data sets comprises a set of variables to allow the corresponding serial I/O port to be monitored and controlled by a host computer, each data set comprising variables representing the presence of input and output to and from the port respectively and variables representing data configuration required by the port.

4. An NFI according to claim 2 in which the plurality of parallel I/O ports comprises a plurality of groups of parallel I/O ports and each of the parallel I/O data sets comprises a multi-element array of boolean values corresponding one-to-one with the members of a corresponding one of the groups of parallel I/O ports, each data set also being provided with a further boolean variable to indicate whether the connections in its corresponding group of parallel I/O's are inputs or outputs.

5. An NFI according to any preceding claim, in which in order to enable a host computer to read or write data to or from an internal location of a field device attached to the I/O port means of the NFI, the field device having a communications protocol incompatible with the network communications protocol, the program means includes a set of protocol programs for commonly-used field device communications protocols and a program module which, using a preselected one of the protocol programs applicable to the attached field device, maps the READ and WRITE services of the network communications protocol through the I/O port means of the NFI onto designated data locations within a field device attached to the port means.

6. An NFI according to claim 5 having user-interface facilities to enable protocol program selection at the time of connection of the field device to the I/O port means.

7. An NFI according to claim 6, having user interface facilities with switch means for allowing a user to configure the NFI for use with particular field devices, the program means including means for sampling the state of the switch means and changing data values at preselected locations in the memory means in accordance with the sampled state of the switch means.

8. An NFI according to claim 6, having user interface facilities with switch means for allowing a user to change the mode of operation of the NFI between a normal run mode for use on the network and an installation mode for setting up the NFI to work with particular field devices, the program means including means for sampling the state of the switch means and changing the mode of operation in accordance with the sampled state of the switch means.

9. An NFI according to claim 6, the program means including means for sampling the state of the I/O port means and displaying the sampled state on the display means.

10. An NFI according to claim 5, in which the program means includes means for a host computer in communication with the NFI to define a plurality of variables within the program module such that the variables can be mapped onto the internal data locations of the attached field device.

11. An NFI according to claim 10 in which the program means includes means for the host computer to define the plurality of variables in terms of address information, the address information defining the locations, within the attached device, of data corresponding to the variables, and further means to pass the address information to the protocol program whenever a host computer requests one of the READ and WRITE services in respect of the attached device.

12. An NFI according to claim 5, in which the program module is provided with sample-and-hold means to continuously and automatically poll predetermined variables on a regular basis, thereby to reduce the time needed by a host computer to access a field device attached to the NFI consequent upon the host computer making a READ request for a specified variable using the network's READ & WRITE services, the READ request being immediately satisfied by the program module returning the last sampled value of the variable.

13. An NFI according to claim 5, in which the program module is provided with means for notifying a host computer if a change occurs in the value of a variable designated by the host computer.

14. An NFI according to claim 1 in which the program means is provided with means to manipulate flag data in the parallel or serial I/O data sets relating to operation of a field device attached to the I/O port means of the NFI, thereby to coordinate host computer access to the I/O port means.

15. An NFI according to claim 14 in which the program means has means for delaying READ or WRITE requests from or to the parallel or serial I/O data sets consequent upon presence or absence of flag data therein.

16. An NFI according to claim 14, in which the flag data correspond to semaphores as specified for the Manufacturing Message Service international standard.

17. An NFI according to claim 1 in which the network's communication protocol comprises the Manufacturing Message Service international standard.

18. An NFI according to any of claims 2 to 4 in which the I/O data sets correspond to domains as specified for the Manufacturing Message Service international standard.

19. An NFI according to claim 1 adapted for operation in conjunction with a Manufacturing Automation Protocol network.

20. An NFI according to claim 19, the network being a carrierband network.

21. An NFI according to claim 19, the network being a broadband network.

22. An NFI according to claim 19, the network being a fibre-optic network.

23. A network-field interface, hereinafter referred to as an NFI, intended for digitally interfacing at least one host computer on a network to at least one field device having internal data locations, the network operating with a predetermined communications protocol including READ and WRITE services, the NFI comprising:
  (a) I/O port means for connection to the at least one field device;
  (b) communication means to facilitate communication between the network and the interface;
  (c) data processing means;
  (d) memory means accessible to both the communication means and the data processing means; and
  (e) program means resident in the memory means and executable by the data processing means to map the READ and WRITE services onto the I/O port means, whereby the host computer is able to READ and WRITE directly to the I/O port means through the communication means,
  the program means including a program module for mapping the READ and WRITE services of the network communications protocol through the I/O port means of the NFI onto designated data locations within said at least one field device, and means for a host computer in communication with the NFI to define a plurality of variables within the program module such that the variables can be mapped onto said internal data locations of said at least one field device.

24. A network-field interface, hereinafter referred to as an NFI, intended for digitally interfacing at least one host computer on a network to at least one field device having internal data locations, the network operating with a predetermined communications protocol including READ and WRITE services, the NFI comprising:
  (a) I/O port means for connection to the at least one field device;
  (b) communication means to facilitate communication between the network and the interface;
  (c) data processing means;
  (d) memory means accessible to both the communication means and the data processing means; and
  (e) program means resident in the memory means and executable by the data processing means to map the READ and WRITE services onto the I/O port means, whereby the host computer is able to READS and WRITE directly to the I/O port means through the communication means,
  the program means including a protocol program for a communications protocol applicable to the at least one field device and means for the host computer in communication with the NFI to define a plurality of variables within the program means in terms of address information, the address information defining locations within the at least one field device of data corresponding to the variables, and further means to pass the address information to the protocol program whenever a host computer requests one of the READ and WRITE services in respect of the at least one field device, whereby the READ and WRITE services of the network communications protocol are mapped through the I/O port means of the NFI onto the data locations within the at least one field device.

25. A network-field interface according to claim 23 or claim 24, in which the program means is provided with sample-and-hold means to continuously and automatically poll predetermined of the variables on a regular basis, thereby to reduce the time needed by a host computer to access said at least one field device consequent upon the host computer making a READ request for a specified variable using the network's READ & WRITE services, the READ request being immediately satisfied by the program means returning the last sampled value of the variable.

26. A network-field interface according to claim 23 or claim 24, in which the program means includes means for notifying the at least one host computer if a change occurs in the value of at least a predetermined one of the variables.

27. A network-field interface according to claim 23 or 24, in which the program means includes means for creating at least one I/O data set corresponding to the I/O port means as appropriate for the communications protocol, said I/O data set having flag data associated therewith, said flag data relating to operation of said at least one field device, and means for manipulating said flag data in said at least one I/O data set, thereby to coordinate host computer access to the I/O port means.

28. A network-field interface according to claim 27 in which the program means has means for delaying READ or WRITE requests from or to the at least one I/O data set consequent upon presence or absence of flag data therein.

* * * * *